United States Patent
LeBoe (10) Patent No.: US 6,534,950 B2
(45) Date of Patent: Mar. 18, 2003

(54) HYBRID POWER SUPPLY CONTROL SYSTEM AND METHOD (75) Inventor: David LeBoe, Vancouver (CA)

(73) Assignee: Cellex Power Products, Inc., Richmond (CA)

(*) Notice: Subject to any disclaimer, the term of this patent is extended or adjusted under 35 U.S.C. 154(b) by 0 days.

(21) Appl. No.: 09/957,360

(22) Filed: Sep. 20, 2001

(65) Prior Publication Data

US 2002/0175657 A1 Nov. 28, 2002

Related U.S. Application Data (60) Provisional application No. 60/293,733, filed on May 25, 2001.

(51) Int. Cl.$^7$ .................................................. H02J 7/00
(52) U.S. Cl. ........................................ 320/104; 320/103
(58) Field of Search ............................... 320/104, 103, 320/137, 132, 136, 124; 307/9.1, 10.1

(56) References Cited

U.S. PATENT DOCUMENTS

| | | | |
|---|---|---|---|
| 3,821,626 A | 6/1974 | Maver et al. | 320/3 |
| 4,380,726 A | 4/1983 | Sado et al. | 320/48 |
| 4,436,793 A | 3/1984 | Adlhart | 429/17 |
| 4,650,729 A | 3/1987 | Nakamura et al. | 429/61 |
| 4,670,702 A | 6/1987 | Yamada et al. | 320/21 |
| 4,677,037 A | 6/1987 | Takabayashi | 429/9 |
| 4,741,978 A | 5/1988 | Takabayashi | 429/23 |
| 4,839,246 A | 6/1989 | Takabayashi | 429/12 |
| 4,839,574 A | 6/1989 | Takabayashi | 320/3 |
| 4,883,724 A | 11/1989 | Yamamoto | 429/23 |
| 4,931,947 A | 6/1990 | Werth et al. | 364/492 |
| 4,961,151 A | 10/1990 | Early et al. | 364/492 |
| 4,962,462 A | 10/1990 | Fekete | 364/492 |
| 5,075,813 A | 12/1991 | Takabayashi | 361/84 |
| 5,139,894 A | 8/1992 | Mizuno et al. | 429/9 |
| 5,332,630 A | 7/1994 | Hsu | 429/20 |
| 5,334,463 A | 8/1994 | Tajima et al. | 429/9 |
| 5,601,936 A | 2/1997 | Dudfield et al. | 429/13 |
| 5,623,194 A | 4/1997 | Boll et al. | 320/15 |
| 5,631,532 A * | 5/1997 | Azuma et al. | 320/102 |
| 5,710,699 A | 1/1998 | King et al. | 363/132 |
| 5,714,874 A | 2/1998 | Bonnefoy | 323/299 |
| 5,726,551 A * | 3/1998 | Miyazaki et al. | 320/104 |
| 5,760,488 A | 6/1998 | Sonntag | 307/10.1 |
| 5,780,980 A | 7/1998 | Naito | 318/139 |
| 5,820,172 A | 10/1998 | Brigham et al. | 290/40 |
| 5,929,595 A | 7/1999 | Lyons et al. | 320/104 |
| 5,945,808 A | 8/1999 | Kikuchi et al. | 320/132 |
| 6,011,379 A | 1/2000 | Singh et al. | 320/132 |
| 6,214,484 B1 | 4/2001 | Hauer | 429/9 |

FOREIGN PATENT DOCUMENTS

JP  02291668  12/1990  ............ H01M/8/04

* cited by examiner

Primary Examiner—Edward H. Tso
Assistant Examiner—Lawrence Luk
(74) Attorney, Agent, or Firm—Oyen Wiggs Green & Mutala (57) ABSTRACT This application relates to a control system and method for use in a hybrid power supply apparatus comprising a current generating device, such as a fuel cell, and an energy storage device, such as a battery. The invention ensures that the fuel cell operates in a quasi steady state mode irrespective of fluctuations in load power demands. By restricting the operation of the fuel cell to discrete steady modes with minimal state changes, the useful service life of the fuel cell is prolonged. The control scheme ensures that the current generating device will run in a near steady mode even in the presence of a dynamic load.

15 Claims, 11 Drawing Sheets

HYBRID POWER SUPPLY CONTROL SYSTEM AND METHOD

This application claims the benefit of No. 60/293,733, filed May 25, 2001.

TECHNICAL FIELD

This application relates to a control system and method for use in a hybrid power supply apparatus comprising a current generating device, such as a fuel cell, and an energy storage device, such as a battery. The invention ensures that the fuel cell operates in a quasi-steady state mode irrespective of fluctuations in load power demands. By restricting the operation of the fuel cell to discrete current output modes with minimal state changes, the useful service life of the fuel cell is prolonged.

BACKGROUND

Hybrid power supply systems comprising a current generating device, such as a fuel cell, and an energy storage device, such as a battery, are well known in the prior art. In a hybrid system the fuel cell is used to charge the storage battery which in turn supplies power to a load on an "on-demand" basis. Alternatively, the fuel cell and the battery may jointly supply power to the load depending upon the power requirements.

Hybrid power systems offer several advantages. Many fuel cell systems include fuels processors such as reformers for converting conventional fuels to hydrogen or hydrogen-enriched gas for use by the fuel cell. In general, the combination of a fuel cell and a reformer makes it difficult to respond quickly to variations in external load since the response time of the reformer is slow. This is particularly the case for loads such as electric lift vehicles which have a pattern of power usage or "duty cycle" which is characterized by loads which fluctuate substantially during the course of a work shift. The addition of a charged energy storage means enables the hybrid system to respond quickly to power demand surges, while maintaining the advantages of a fuel cell system including extended operating times, low emissions and the flexibility to utilize many readily available fuels.

Hybrid power supply control systems are known in the prior art for use in applications subject to sudden load fluctuations. U.S. Pat. No. 4,883,724, Yamamoto, issued Nov. 28, 1989 relates to a control unit for a fuel cell generating system which varies the output of the fuel cell depending upon the state of charge of the battery. In particular, a DC/DC converter is connected between the output of the fuel cell and the battery and is responsive to a control signal produced by a controller. The purpose of the Yamamato invention is to ensure that the storage battery is charged for recovery within the shortest possible time to reach a target remaining charge capacity under charging conditions that do not cause deterioration of performance of the battery. When the charged quantity of the battery is recovered to the target value, the controller lowers the output of the fuel cell to its normal operating state. In the case of no external load, such as during extended periods of interruption in the operation of the lift truck, the fuel cell is controlled to stop after the storage battery is charged.

The primary limitation of the Yamamoto control system is that the control algorithm is designed for minimizing the recharge time of the storage battery rather than prolonging the useful life of the fuel cell. By varying the fuel cell output to charge the storage battery for recovery within the shortest possible time, the long-term performance of the fuel cell is compromised. The need has therefore arisen for an improved hybrid control system and method which preserves near steady state operation of the fuel cell while avoiding both over-charge and over-discharge of the battery.

U.S. Pat. No. 4,839,574, Takabayashi, also discloses a generator system utilizing a fuel cell and a reformer. Depending upon the state of charge of the battery the output of the fuel cell may be adjusted in a stepwise fashion. In the Takabayashi system the amount of raw material supplied to the reformer is maintained constant within a range of charged energy to ensure stable operation of the reformer. However, depending upon the state of charge of the battery and the load demands, the fuel cell and the reformer may be subject to frequent adjustments.

As has been shown in the prior art, it is desirable to choose discrete charging currents corresponding to the specific states of charge of the battery in order to operate the fuel cell (or other current generating device) in a steady mode. However, this approach can result in unstable operation when used with a dynamic load such as a hybrid vehicle. The result can be cycling between states. The purpose of this invention is to introduce a control scheme which will ensure that the current generating device can run in a near steady mode in the presence of a dynamic load.

SUMMARY OF THE INVENTION

In accordance with the invention, a method of controlling the charging characteristics of a hybrid power supply apparatus comprising a current generating device and an energy storage device connectable to an external load is disclosed. The method comprises the steps of:

(a) repeatedly determining the state of charge of the energy storage device;

(b) operating the current generating device during an operating period to produce an output current for delivery to the energy storage device;

(c) repeatedly comparing the state of charge determined in step (a) to a predetermined set of target state of charge set points for the energy storage device stored in memory; and (d) adjusting the output current of the current generating device by a predetermined increment whenever the state of charge of the energy storage device approximates one of the target state of charge set points, wherein said predetermined increment is sufficiently large in magnitude such that the frequency of adjustment of the output current is minimized during the operating period notwithstanding fluctuations in the power demands of the load.

The current generating device may comprise a fuel cell. Preferably the current generating device produces a DC output current and the DC output current is delivered from the current generating device to the energy storage device via a DC/DC converter. The fuel cell output current is preferably adjusted by controlling the operation of a fuel processor delivering fuel to the fuel cell. The method may further include the step of calculating the predetermined increment according to a control algorithm such that the time period between adjustments of the output current is not less than a minimum time T. The method may further include the step of dynamically storing the state of charge set points during the operating period.

A hybrid power generating system is also disclosed for implementing the above method, the system comprising:

(a) an energy storage device connectable to a load;

(b) a current generating device for producing a charging current during an operating period;

(c) a detector for determining the state of charge of the energy storage device; and (d) a controller for controlling the operation of the current generating device, wherein the controller receives input from the detector and comprises means for repeatedly comparing the state of charge of the energy storage device to a predetermined set of target state of charge set points stored in memory, wherein the controller adjusts the charging current of the current generating device in predetermined discrete increments whenever the measured state of charge of the energy storage device approximates one of the target set points, the increments being sufficiently large in magnitude such that the frequency of adjustment of the charging current is minimized during the operating period notwithstanding fluctuations in the load.

In one embodiment of the invention Applicant's method may include the steps of:

(a) repeatedly determining the state of charge of the energy storage device;

(b) operating the current generating device during an operating period to produce an output current for delivery to the energy storage device;

(c) storing in a memory a set of target state of charge set points for the energy storage device, the set points defining a plurality of state of charge intervals;

(d) storing in a memory a plurality of charge rates for the output current, each of the charge rates corresponding to at least one of the state of charge intervals;

(e) repeatedly comparing the state of charge determined in step (a) to the set of target state of charge set points to assign one of the state of charge intervals; and (f) setting the output current of the current generating device to a charge rate corresponding to the state of charge interval assigned in step (e).

In a preferred embodiment the minimum time T is at least an order of magnitude larger than the time required to adjust the output current from one of the charge rates to another one of said charge rates.

BRIEF DESCRIPTION OF DRAWINGS

In drawings which illustrate embodiments of the invention but which should not be construed as restricting the spirit or scope of the invention in any way.

DESCRIPTION OF INVENTION

Figure 1:
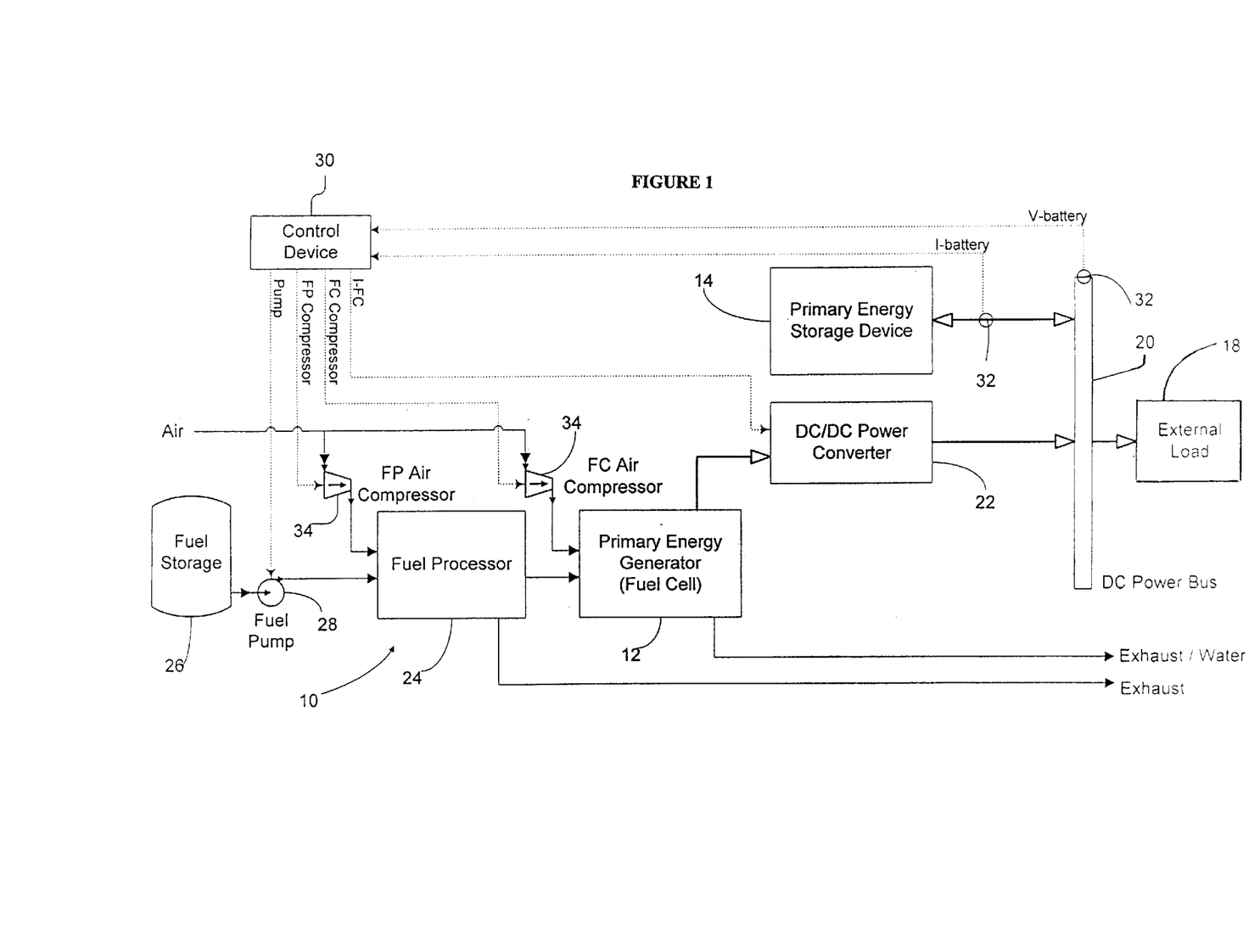
FIG. 1 is a schematic diagram showing an exemplary hybrid power supply system comprising a fuel cell and a battery.

FIG. 1 illustrates schematically the general system architecture of a hybrid power supply device 10. Power supply device 10 is "hybrid" in character since it includes both a current generating device, such as a fuel cell 12, and separate energy storage means, such as a battery 14. A conventional DC/DC power converter 22 is also preferably provided for converting raw DC current outputted by fuel cell 12 and delivering conditioned current to battery 14 or to load 18 via bus 20.

As will be apparent to a person skilled in the art, the invention may have application to current generating devices other than fuel cells. For example, in some applications it may be desirable to operate conventional battery chargers, such as gasoline driven engines, in a near steady state mode.

Hybrid power supply device 10 may employ various types of fuels. In preferred embodiments, readily available fuels such as methanol and propane (LPG) are used. In such cases, device 10 includes a fuel processor, such as a reformer 24, for converting raw fuel to substantially pure hydrogen or hydrogen-enriched gas suitable for use by fuel cell 12. Reformer 24 is coupled to fuel storage chamber 26 with suitable fuel lines. A fuel pump 28 may be provided for delivering fuel from chamber 26 to reformer 24.

Figure 2:
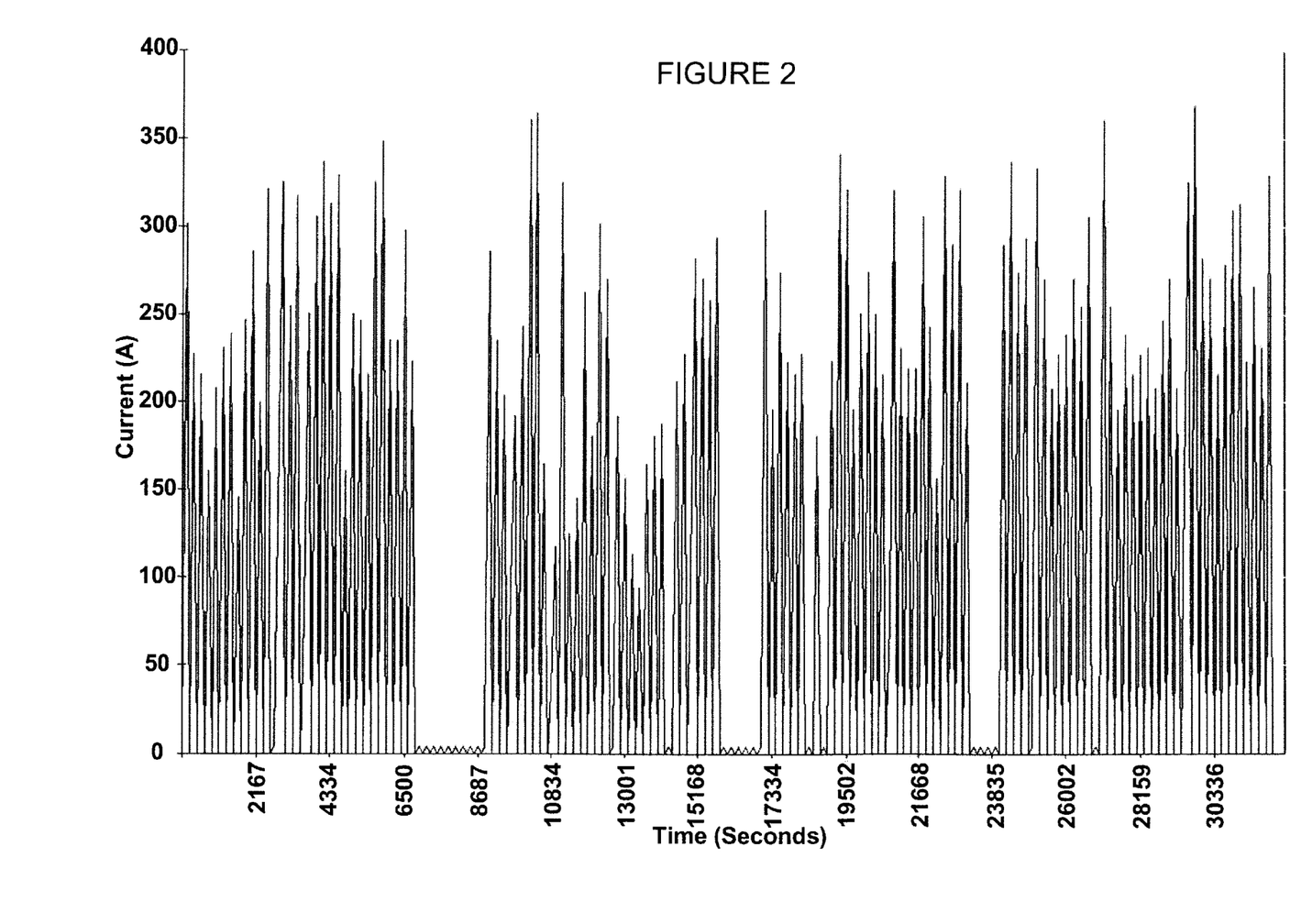
FIG. 2 is a graph illustrating a characteristic duty cycle of an electric lift vehicle.

A computer controller 30 which receives input from various sensors, including voltage, current and temperature sensors 32 (FIG. 3), controls charging of battery 14 as discussed further below. As shown in FIG. 2, controller 30 may also control the operation of fan blowers 34 that circulate air through device 10 to maintain the operating temperature of the various system components within preferred temperature ranges and supply reactants to the fuel cell 12 and reformer 24.

As will be appreciated by a person skilled in the art, hybrid power supply device 10 is suitable for supplying electrical energy to various types of loads 18. One particular application of the invention is for use in low power products, such as electric non-road vehicles. For example, device 10 may be used as a substitute for conventional lead-acid traction batteries in electric lift trucks, ground support equipment and the like as described in applicant's co-pending application Ser. No. 09/785,878 filed Feb. 16, 2001, the text and drawing of which are incorporated herein by reference. Sudden load fluctuations are commonplace in such vehicles. As shown in FIG. 2, lift trucks typically have a pattern of power usage or "duty cycle" which is characterized by loads which fluctuate substantially during the course of a work shift. In the example of a typical class 3 forktruck, although the average load across an entire seven hour work shift can be less than 1 kW, power requirements on the order of 8–10 kW for short durations are required at irregular intervals to meet operational demands. The work shift may include extended periods where there is no load whatsoever. In general, non-hybrid systems comprising the combination of a fuel cell and a reformer are not capable of responding to such sudden load fluctuations since the response time of the reformer is slow. In a hybrid system as exemplified by device 10, fuel cell 12 is used to charge a storage battery 14 which in turn jointly (i.e. together with fuel cell 12) supplies power to load 18 on an "on-demand" basis.

Typically, prior art hybrid fuel cell control systems focus on controlling the fuel cell power generating system (i.e. fuel cell 12 and reformer 24) to the best of it's dynamic capabilities to maintain the state of charge of battery 14 at a target value. By maintaining battery 14 in such a fashion both over-charge and over-discharge can be avoided thereby prolonging the service life of battery 14. It is the object of the present invention to provide a control strategy which takes further advantage of the hybrid system architecture to prolong the service life of fuel cell 12 by limiting its operation to discrete steady state modes with minimal state changes while also preserving the maintenance of battery 14. The invention allows for slow transient responses of the fuel cell system while simultaneously providing "on demand" power to a dynamic load 18 as seen in a lift truck, for example.

Typically, using sealed lead acid batteries as an example, a constant voltage charge method is the preferred means for charging the battery cells. Under a constant voltage regime inrush currents are limited by the internal resistance of the battery. Thus, when the battery is in a low state of charge and internal resistance is low, inrush currents can be very large and energy can be restored to the battery very quickly. As the battery becomes charged, it reaches a transition point where a sudden rise in the internal resistance occurs and, under constant voltage, the battery will accept less and less current. This self-regulating effect prevents overcharging of the battery leading to longer lifetimes. Typically such constant voltage charge regimes are conducted at the "float" voltage which is the recommended voltage at which the batteries can be maintained at high states of charge.

In a hybrid configuration, the fuel cell sub-system lifetime can be optimized by restricting it to near steady state operation and not operating it in a load following mode which may require varying power output. With reference to FIG. 1, the best way to accomplish this is to control the output current of fuel cell 12 and hold it constant. The DC/DC converter 22 is used to isolate fuel cell 12 from the transient voltages on the DC bus 20 and the terminals of battery 14 and convert the constant input current to varying output currents as a function of the varying output voltage on bus 20. This constant current command however makes the constant voltage control on the output impossible unless a feedback signal is returned to the fuel cell current control means and the fuel cell current is adjusted accordingly, which again creates a load following mode of operation which is undesirable.

The present invention comprises a control system for implementing a constant current battery charging algorithm under simultaneous dynamic loading of battery 14 to preserve near steady state operation of fuel cell 12 while upholding the current accepting limitations of battery 14 observed under the preferred constant voltage charge regime.

Figure 3:
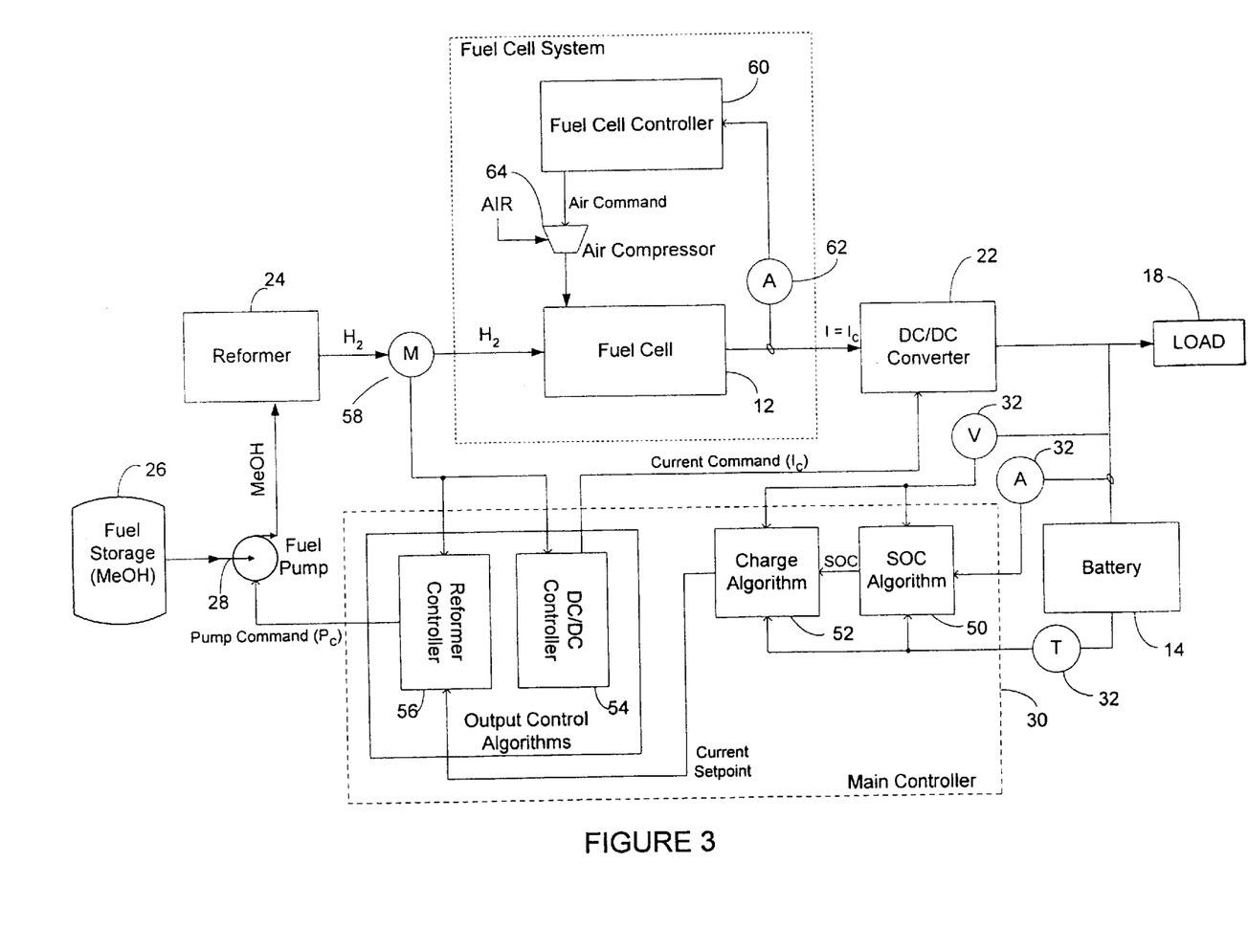
FIG. 3 is a schematic view illustrating a hybrid power supply controls architecture of the present invention.

FIG. 3 illustrates schematically an exemplary hybrid power supply control system architecture developed by the applicant in further detail. Controller 30 includes input processing and output control algorithms stored in memory. More particularly, controller 30 includes a state of charge (SOC) algorithm 50 and a charge algorithm 52 for processing voltage, current and temperature measurements inputted from sensors 32 associated with battery 14, as discussed further below. Algorithm 50 determines the estimated SOC of battery 14. This SOC value is used by charge algorithm 52 to calculate a current set point which is outputted to reformer control 56. Charge algorithm 50 compares the estimated instantaneous SOC value determined by algorithm 50 to a predetermined set of desired battery SOC target values stored in memory. As discussed further below, target charge output set points are also stored in memory corresponding to discrete state of charge intervals.

Depending upon the current set point outputted by charge algorithm 52, reformer control 56 may cause an increase, a decrease or no change in the amount of hydrogen or hydrogen-enriched gas delivered to fuel cell 12. As shown in FIG. 3, this is accomplished by means of a fuel pump command signal $P_C$ which causes a fuel pump 28 to deliver fuel from fuel storage 26 to reformer 24. The volume of the hydrogen supply is detected by a flow sensor 58 which sends a corresponding signal to DC/DC controller algorithm 54 which in turn transmits a current command signal $I_C$ to DC/DC converter 22. This causes converter 22 to draw an appropriate amount of current from fuel cell 12 to achieve the desired target current required by battery 14.

The hydrogen gas is reacted with oxygen gas in fuel cell 12 in the usual manner. The fuel cell subsystem includes a fuel cell controller 60 which receives input from a fuel cell output current sensor 62. Controller 60 controls the operation of a compressor 64 which delivers oxygen gas reactant to fuel cell 12.

As will be apparent from FIG. 3, at no point is the battery SOC, the desired charge current set point or the actual current command $I_C$ communicated to fuel cell controller 60. Rather, in the FIG. 3 embodiment fuel cell 12 is a "slave" to reformer 24 which functions as "master".

Figure 4:
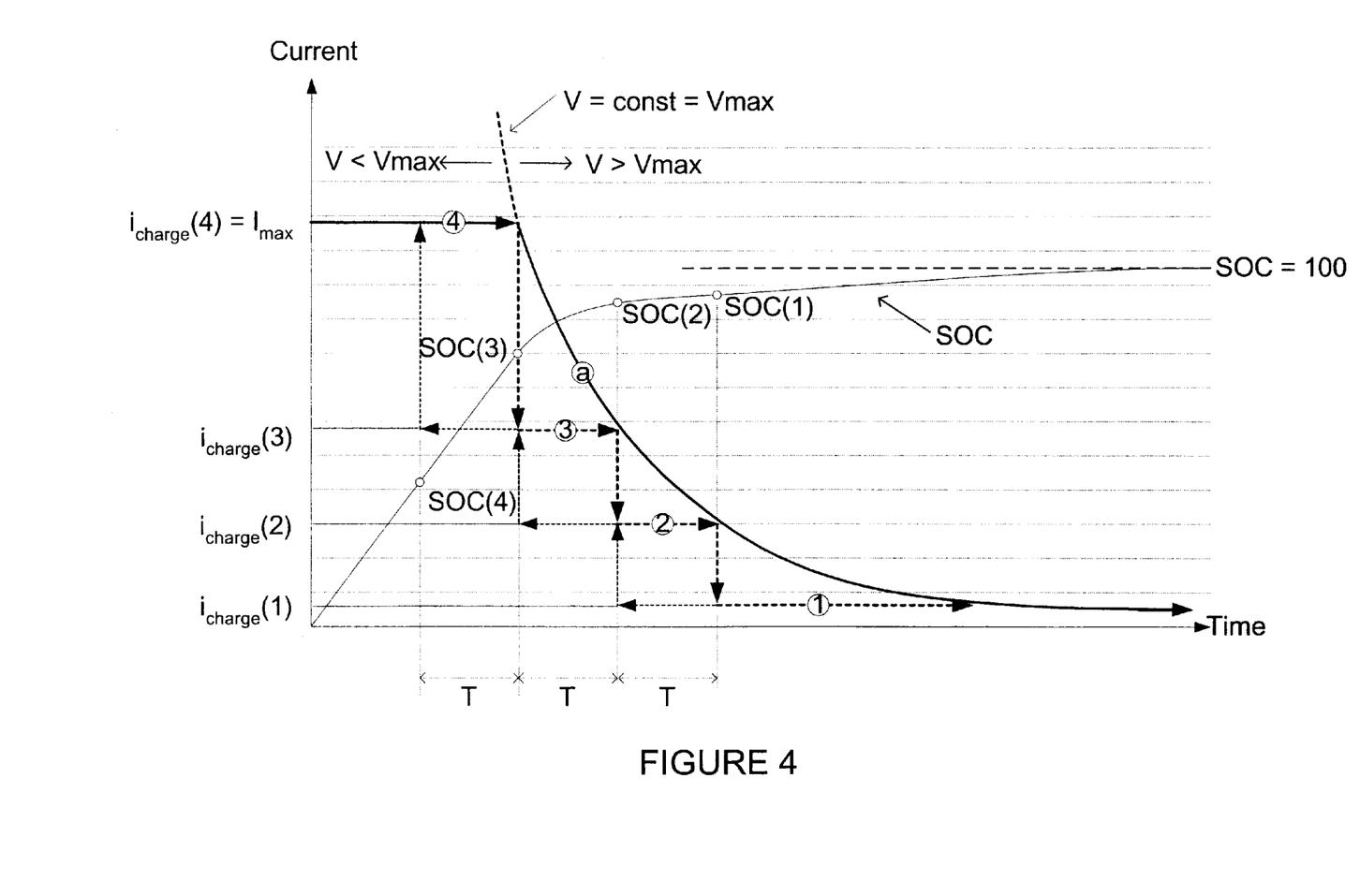
FIG. 4 is a graph showing the charging profile of a battery in an exemplary hybrid power supply system under constant voltage and illustrating the current charge algorithm of the invention.

The charge control algorithm and method described herein is illustrated generally in FIG. 4 which shows a characteristic charge profile conducted under constant voltage at a threshold voltage $V_{max}$. For example, the threshold $V_{max}$ may be the float voltage of the battery which is the recommended voltage at which the battery may be maintained at a high state of charge. $V_{max}$ is generally a function of the battery temperature and will be computed differently for different battery technologies.

The constant voltage charge curve is denoted by symbol (a) in FIG. 4. For all practical chargers there is a current limit I-max which limits the bulk portion of the charge to a constant current regime until the self-regulating current approaches I-max under constant voltage; i.e. where $i_{charge}$ (4) intersects (a). Constant voltage regulation at this point would require a continuous reduction in current along (a) and a continuously variable current draw from fuel cell 12. Since battery 14 will also be experiencing simultaneous loading, sudden current demands and corresponding changes in acceptable current, along (a), would drive fuel cell 12 in an undesirable load following mode.

A control method whereby the SOC (and/or voltage) of battery 14 is continuously monitored (for example, by sensors 32) and limited discrete changes in charge current are implemented to approximate the constant voltage charge curve (a) is proposed whereby the discrete current intervals and corresponding predetermined ramp points are selected according to the following objectives:

1. Current ramp down points are defined to correspond as best as possible to the intersection of the constant current line and the constant voltage line (a) (i.e. when the battery voltage approaches $V_{max}$, or when the SOC corresponds to a terminal voltage of $V_{max}$ at the instantaneous battery current).

2. The magnitude of the current step insures that as charging continues at the new rate, a minimum time T will elapse before a subsequent step down is required.

3. In the event of a period of net discharge, current ramp up points are defined such that not only will battery 14 accept the higher current without surpassing the voltage limit of $V_{max}$ but a minimum of time T will elapse at the new charge rate before a ramp down will again be required. The time T can be selected such that the transient time required by the fuel cell subsystem to achieve the new current set point (e.g. to traverse from $i_{charge}$ (3) to $i_{charge}$ (2)) is trivial in comparison to the dominant time spent operating at steady state. Furthermore, the time T may also be optimized such that the overall charge time is not significantly reduced by limiting the amount of charge current to battery 14.

The detection of ramp down points can be done, as partially described above, by monitoring either the voltage of battery 14 for the onset of the threshold voltage $V_{max}$, or by monitoring the SOC of battery 14 with reference to a predetermined knowledge of it's correlation to the battery voltage under the present charge current. The use of the ladder method will become obvious with the consideration of the ramp up points determination method.

The ramp up points are detected by a correlation of the battery SOC and its corresponding voltage at the new charge current. For example, referring to FIG. 4, suppose the SOC of battery 14 is recorded at the point where $i_{charge}$ (3) is ramped down to $i_{charge}$ (2), namely SOC (2), and battery 14 proceeds to be charged at $i_{charge}$ (2) until a second ramp down to $i_{charge}$ (1) is required, where the SOC is now SOC(1)). Further suppose a net discharge is then imposed on battery 14, and the SOC being continuously monitored returns to a value of SOC(2). In this example a current ramp up back to $i_{charge}$ (2) may be done which will guarantee a minimum time T will elapse before a ramp down to $i_{charge}$ (1) is again required, even in the absence of any further external load 18.

The determination of the SOC ramp points may be specified as either fixed or variable:

1. Fixed SOC ramp points can be implemented such that the ramp downs and ramp ups occur as shown in FIG. 4 at fixed SOC values determined according to predetermined properties of battery 14. This may cause the voltage of battery 14 to either overshoot or undershoot $V_{max}$ under certain circumstances such as changes in battery temperature, battery degradation, etc.
2. Variable SOC ramp points can be stored dynamically at each onset of $V_{max}$ and corresponding current ramp downs. These SOC values are stored as references for subsequent ramp ups. When net charging recommences, new SOC points can be stored again as the voltage approaches $V_{max}$ at the given charge rate. This method prevents overshoot and undershoot of the battery voltage and compensates to some degree for changes in battery properties during use.

The above variants are described further in the following detailed examples.

Figure 5:
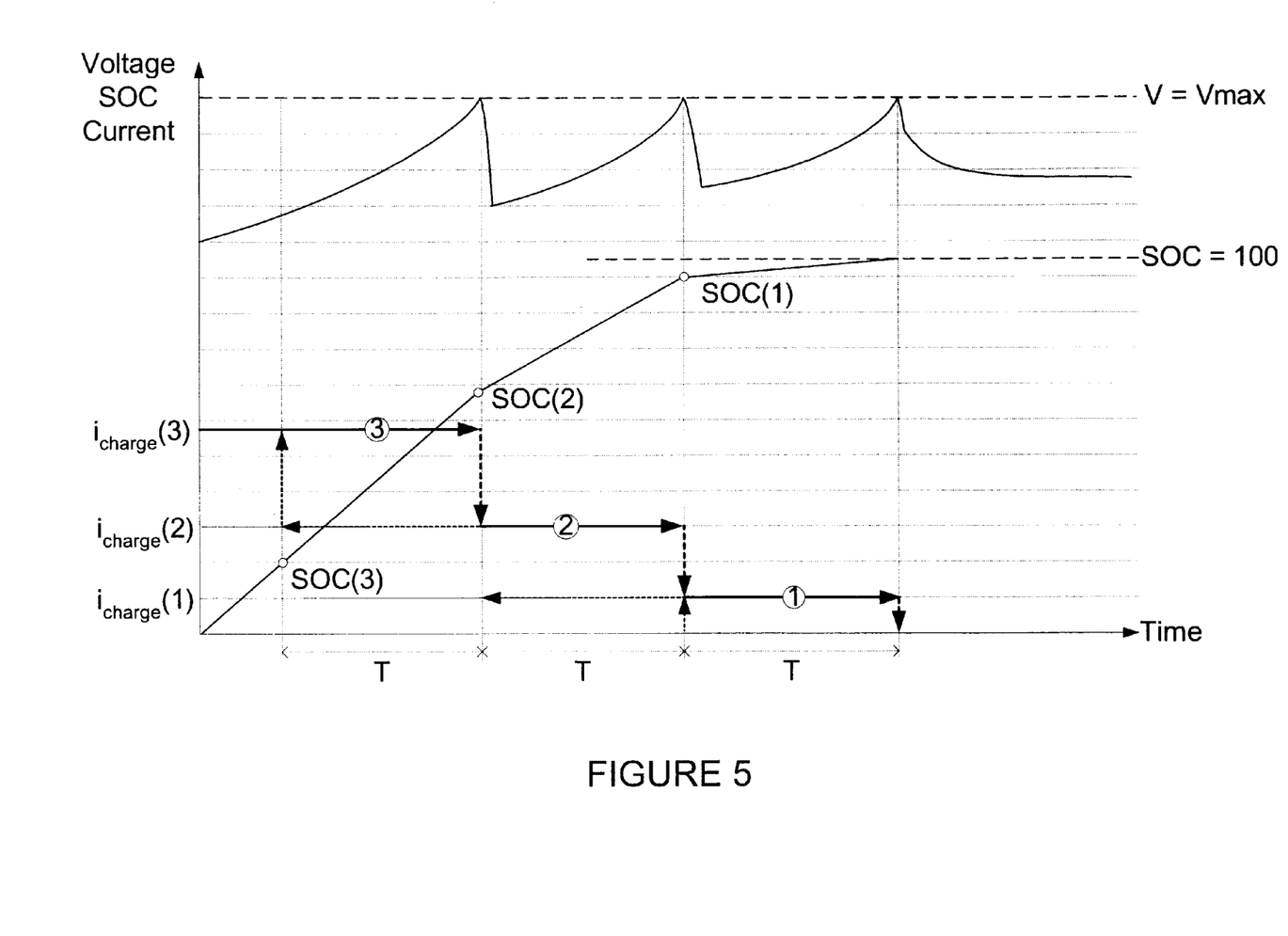
FIG. 5 is a graph showing the charging profile of a battery in one embodiment of the invention showing charge ramp points mapped to fixed state of charge values.

FIG. 5 illustrates an embodiment of the invention where the current adjustment or ramp points are mapped to fixed, predetermined SOC values. For example, if the internal properties of the battery are known, such as temperature, charge/voltage characteristics, age and history, constant charge current values may be selected empirically such that under no load, a constant charge current may be maintained for a minimum time T before a subsequent ramp down of current will be required. The requirement for a current ramp down would be based on the onset of a threshold voltage ($V_{max}$) being achieved at the battery terminals under the given charge current ($i_{charge}$).

By mapping the ramp points to a SOC value, if a load were to be imposed on the system during the charge, the SOC of the battery may be used to determine whether or not the current should be increased (i.e. ramped up). As described above, the decision to ramp up will be based on whether the new charge current could be sustained for a minimum time T even if the load were to be simultaneously returned to zero. This criterion will ensure that multiple quick changes in current will not be required and that the voltage limit ($V_{max}$) will not be saturated.

As will be apparent to a person skilled in the art, different strategies for determining the state of charge (SOC) of battery 14 may be employed depending upon the type of battery 14 and the desired application. The particular calculations performed by SOC algorithm 50 to estimate SOC based on input parameters, for example voltage, output current and temperature, may vary without departing from the invention.

This control strategy is of particular importance in the case of a current generating device comprising the combination of a fuel cell 12 and a reformer 24 having relatively slow response times. For example, fuel cell 12 may consume hydrogen produced from a methanol reformer 24 which is not capable of reacting quickly to load fluctuations. If the current were to ramp up prematurely due to a detected depletion of charge resulting, for example, from a sustained load, upon removal of the load the voltage of battery 14 could very quickly saturate the $V_{max}$ limit. A subsequent current ramp down request would be limited by the dynamics of the reformer 24 and could potentially maintain an undesirable over voltage until the system eventually responds. The fixed SOC references will ensure that as the load is removed, the voltage will remain in an appropriate range and the controller may continue to monitor for the onset of the next SOC value corresponding to the $V_{max}$ threshold.

Figure 6:
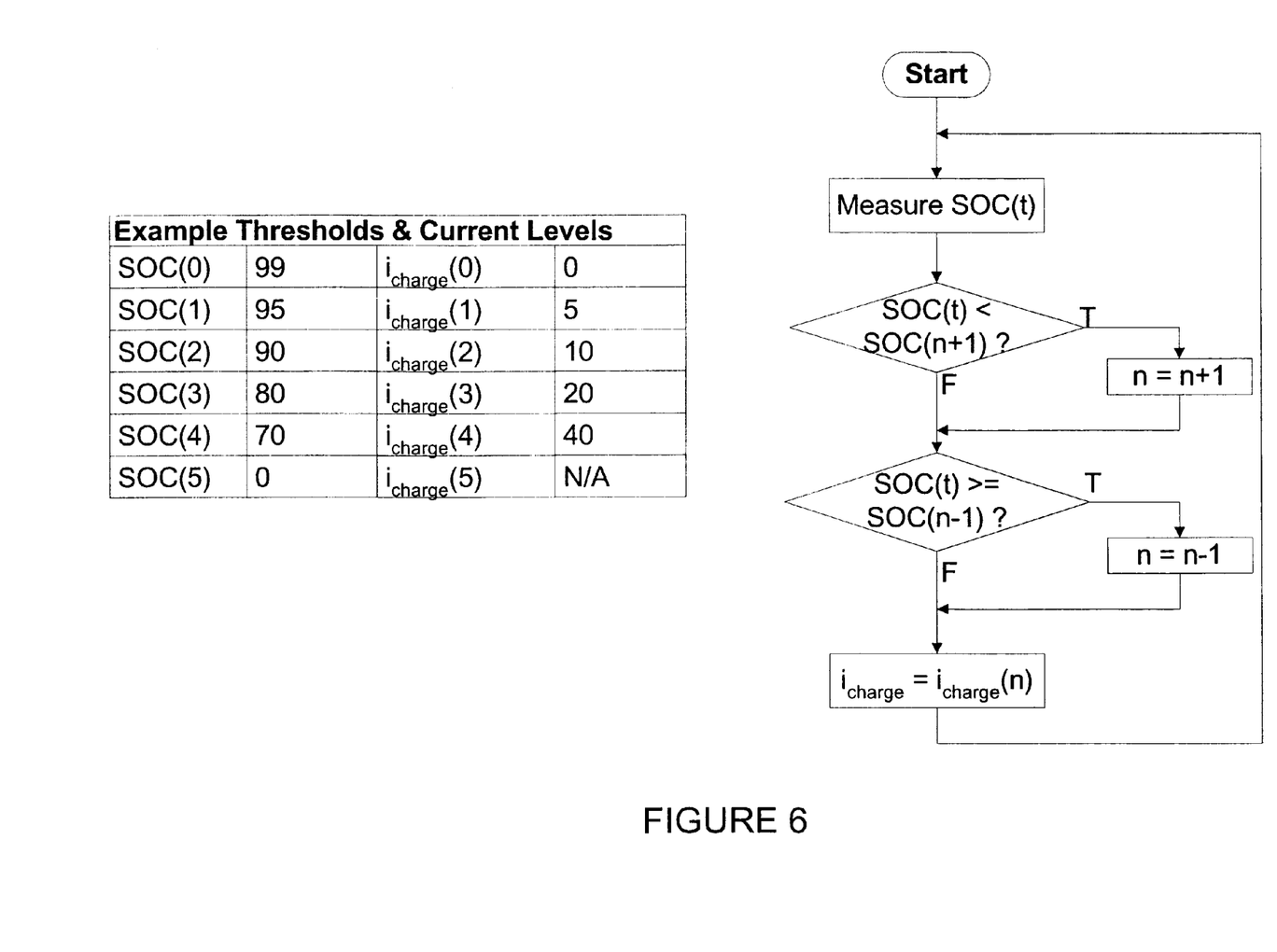
FIG. 6 is a schematic view of an algorithm for controlling adjustment of charge currents as shown in FIG. 5.

If the appropriate relationships for the battery can be determined empirically, a simple algorithm can be used to accomplish the above embodiment, as shown in FIG. 6. This ensures that the charging current $i_{charge}$ will be adjusted at predetermined intervals depending upon the estimated SOC of battery 14. For example, if fuel cell 12 is the charger, it may initially operate at a maximum charge output $i_{charge}(4)$ of 40 amps. The system continuously monitors the SOC of battery 14. As shown in FIG. 3, the SOC algorithm 50 implemented by controller 30 produces an estimate of the battery's instantaneous SOC which is provided as input to charge algorithm 52. Algorithm 52 compares the SOC to the predetermined SOC thresholds stored in memory and transmits a modified current set point to reformer control 56, if necessary. In the FIG. 6 example, the current is ramped down to $i_{charge}(3)$ (i.e. the current output is reduced by 50% from 40 amps to 20 amps) if the battery SOC exceeds the 70% threshold. This ensures that fuel cell 12 can safely operate at the reduced current level for a minimum time T, even in the absence of any load.

Similarly, the output current $i_{charge}$ is successively reduced in predetermined increments when the measured SOC of the battery 14 progressively reaches other SOC thresholds during a charging session (i.e. 80%, 90%, 95% and 99% in the example of FIG. 6). Conversely, when a load is applied to the system resulting in net discharge of the battery capacity, the charge output is increased in a similar step-wise manner. As described above, the current levels and SOC thresholds are selected to ensure that the charge output will not be ramped up prematurely. This ensures that if the load is removed or substantially reduced, it will not be necessary to adjust the charge output for at least a minimum period of time T. As will be appreciated by a person skilled in the art, the minimum time T may vary depending upon the type of charger and battery application. However, generally speaking the goal of the Applicant's control system is to ensure that during the operating period the charger is in a steady state or constant current mode for a substantially greater time period than in a transient or variable current output mode traversing between current set points. For example, time T may be arbitrarily selected to be an order of magnitude greater than the transient time required to change set points, such as five minutes at steady state time T for every 30 seconds of transient time.

Figure 7:
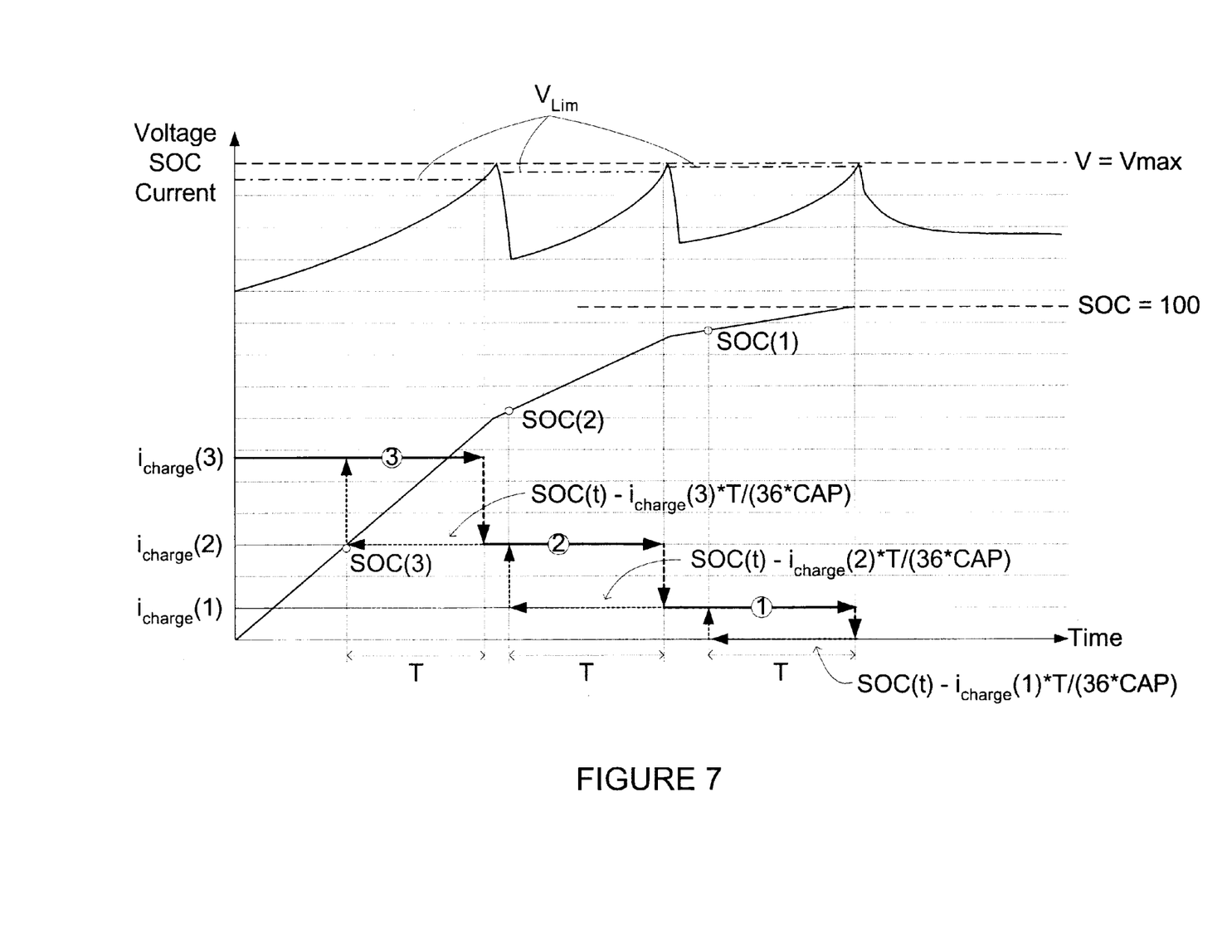
FIG. 7 is a graph showing the charging profile of a battery in another embodiment of the invention showing charge ramp points mapped to dynamic state of charge values.
Figure 8:
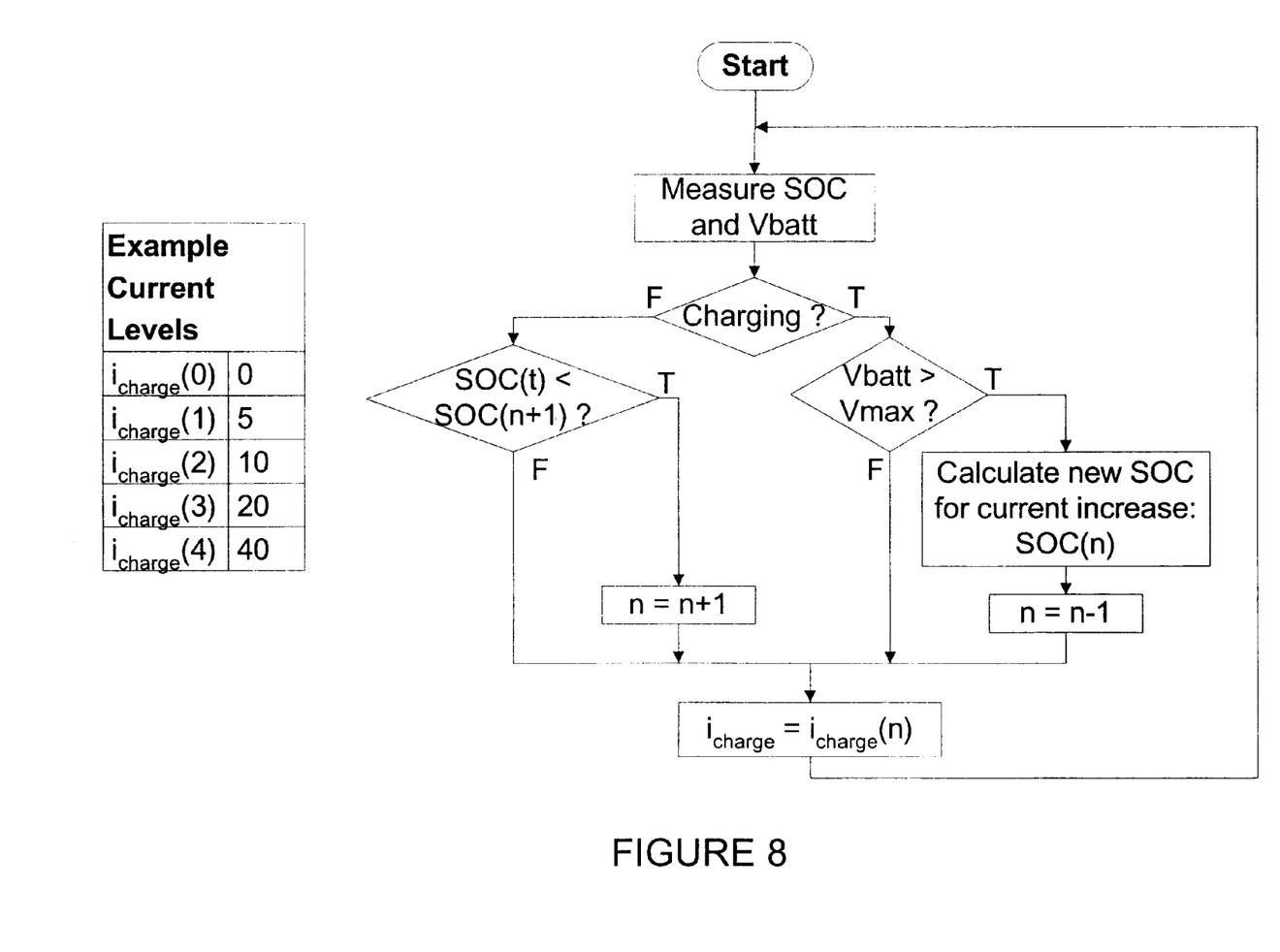
FIG. 8 is a schematic view of an algorithm for controlling adjustment of charge currents as shown in FIG. 7.
Figure 9:
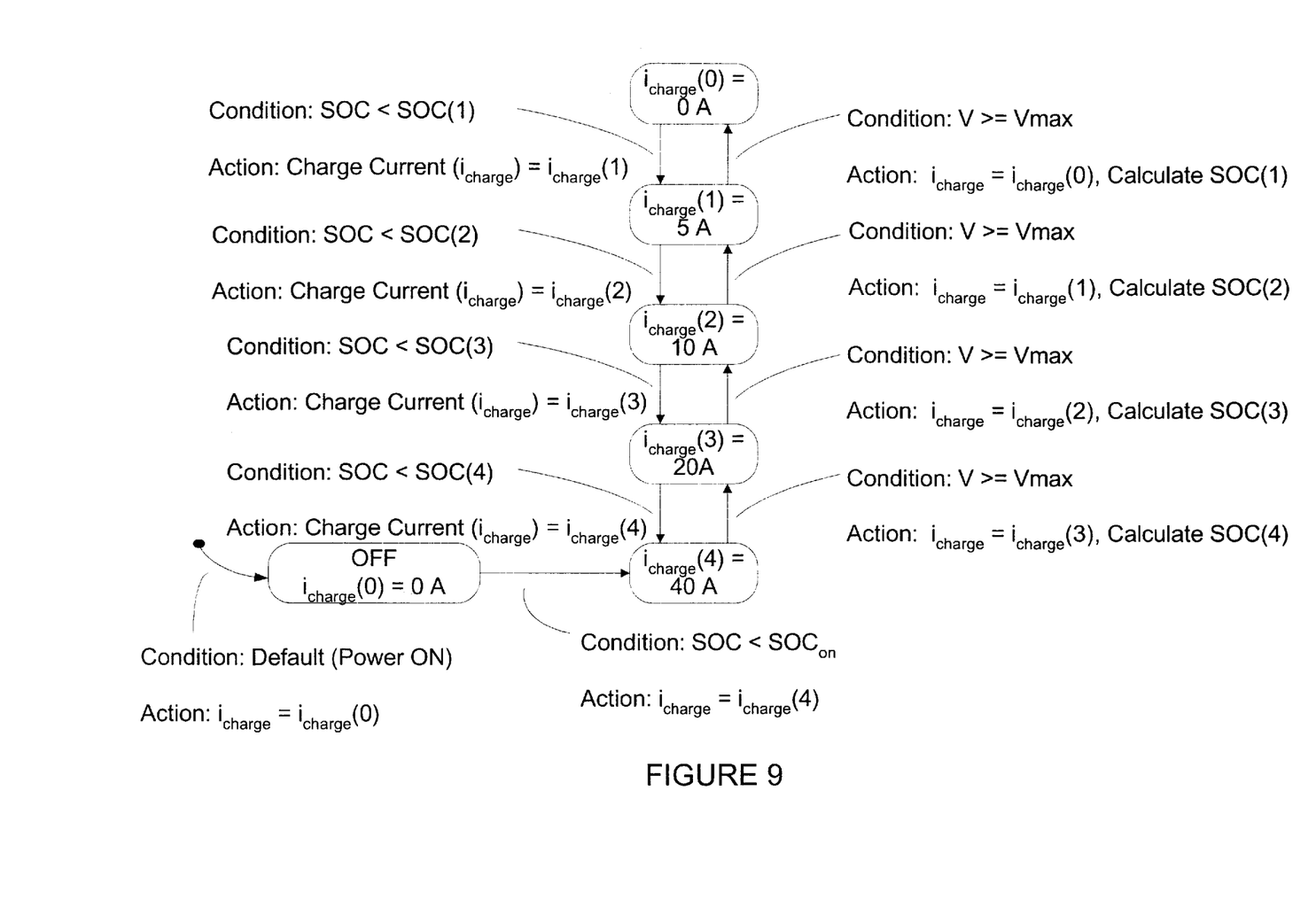
FIG. 9 is a further schematic view of an algorithm for controlling adjustment of charge currents as shown in FIG. 7 showing a sequence of current state transitions.

FIGS. 7–9 illustrate a further alternative embodiment of the invention. In this embodiment the SOC thresholds or ramp points which trigger adjustment of charger output current are dynamically updated and stored during each charging session (i.e. the thresholds are not fixed based upon battery properties as in the embodiment of FIGS. 5–6).

To ensure the ramp points coincide with the onset of the $V_{max}$ threshold, an alternative charge algorithm 52 may be employed which dynamically updates the SOC ramp points in a relative fashion. This approach allows charging to continue until the voltage nears the threshold voltage $V_{max}$. An offset may optionally be assigned to reduce the voltage limit by an amount proportional to the charge current to allow time for the system to respond. For example:

$$V_{Lim} = V_{max} - \left( \frac{ABS(i_{charge})}{i_{max}} \cdot Max\_Offset \right) \quad [1]$$

where:

$V_{Lim}$=Adjusted $V_{max}$ threshold $i_{charge}$=Charge current $i_{max}$=Maximum charge current Max_Offset=Maximum voltage offset to subtract from $V_{max}$ This offset will permit a limited amount of overshoot to be sustained without saturating the $V_{max}$ limit as the system responds to a ramp down request.

In this embodiment the variable algorithm 52 monitors both the SOC of the battery and the battery voltage (FIG. 3). At the onset of $V_{max}$ (or the attainment of $V_{Lim}$), a ramp down request is issued (from $i_{charge}$(n+1) to $i_{charge}$(n)) and the instantaneous SOC(t) is recorded. The corresponding ramp up SOC(n+1) is then computed according to:

$$SOC(n+1) = SOC(t) - \left( \frac{i_{charge}(n+1) \cdot T}{36 \cdot CAP} \right) \quad [2]$$

where:

T=minimum time to spend at the ramped up charge current $i_{charge}$=Charge current CAP=The rated capacity of the battery 36=Units conversion factor In this embodiment of the invention, as the battery charges, and $V_{Lim}$ thresholds are reached, all corresponding ramp up SOC thresholds will be recorded in memory. In particular, the SOC corresponding to the start of the charging increment terminating upon the attainment of $V_{Lim}$ is stored in memory accessible by controller 30. If a ramp up occurs due to an external load, upon charging again, the SOC ramp point will be over-written by calculation [2] when a subsequent ramp down request is issued.

It can be seen that this algorithm will never saturate the $V_{max}$ threshold and will maintain charge currents for a minimum time T even if the internal properties of the battery change over time. Furthermore, because the SOC ramp points are calculated relative to the instantaneous calculated SOC, the benefits of the control algorithm will be maintained even in the presence of errors in SOC estimation. For example, if a SOC estimation method were to use current integration as a means of tracking the remaining capacity of the battery 14, cumulative integration errors may result leading to current ramp up (or down) requests which are undesirable. This algorithm uses relative measures to predict ramp up points and therefore minimizes the effect of integration errors and the like.

In the embodiment of FIGS. 5–6 the only input to charge algorithm 52 is the SOC value determined by algorithm 50. In the embodiment of FIGS. 7–9, charge algorithm 52 may also receive voltage and temperature inputs from sensor 32 to enable dynamic updating of the SOC threshold values.

Referring further to FIG. 9, it can also be seen that upon initialization of this algorithm, if no default initial SOC points are entered, the algorithm will not perform the ramp ups required to then ramp down and perform the SOC point calculations. For this reason it is a preferred embodiment to initialize the algorithm by setting the initial charge current to the highest value and setting only 1 initialization threshold ($SOC_{on}$) for which the charger will turn on to full current. This approach will allow all subsequent ramp downs to initialize each SOC ramp up point dynamically as required and no initial estimates of their locations are required. To accomplish this the charger algorithm can be expressed as a sequence of state transitions as shown in FIG. 9 (which shows 4 example current levels/states).

Figure 10:
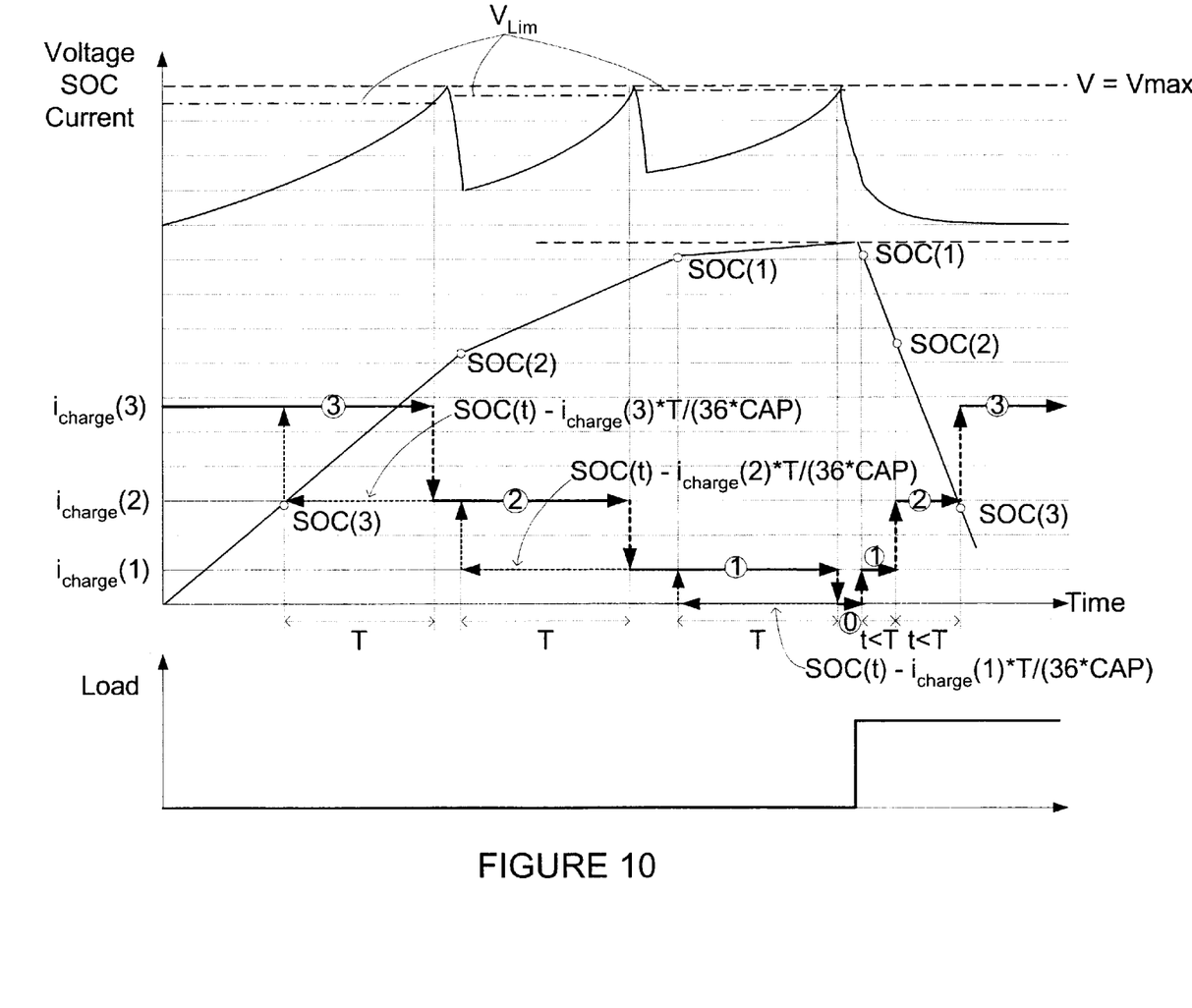
FIG. 10 is a graph showing the charging profile of a battery illustrating the desirability of a timer to ensure that the charge current is maintained at a predetermined state for a minimum time T during a current discharging session.

As described above, the embodiment of FIGS. 7–9 dynamically controls the ramp up points such that after a ramp up, if the load were removed, the charge at the new current level would safely continue for a minimum time T before the voltage threshold of the battery would be reached. What it does not account for, however, is the time between subsequent ramp ups in the presence of an external load greater than the instantaneous charge current (i.e. a net discharge scenario). For example, if the system were initialized at the maximum charge current (after detection of SOC(t)<$SOC_{on}$), the external load was then removed and the charge continued such that the current level was now $i_{charge}$ (1), if an external load were to return and be significantly large, then multiple current ramp up SOC points may be passed in a short period of time. This undesirable effect is shown in FIG. 10.

Figure 11:
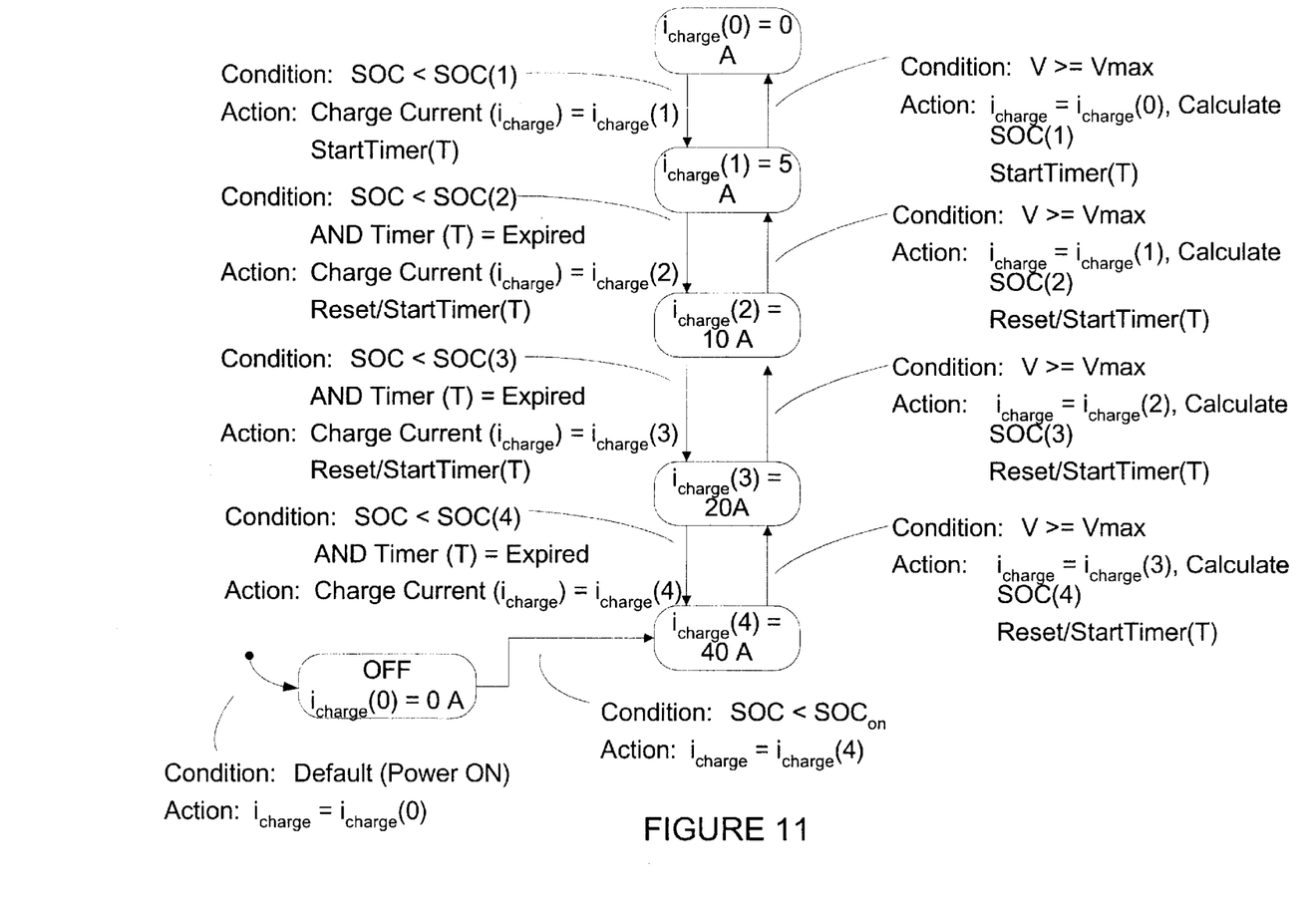
FIG. 11 is a schematic view of an algorithm for controlling adjustment of charge currents as shown in FIG. 10 showing a sequence of current state transitions.

To rectify this situation a simple modification to the state transition conditions (of FIG. 10) can be made which constitutes the addition of a timer which postpones the current ramp up request from being implemented until a minimum time T has passed. The algorithm remains unchanged otherwise. The addition of the timer will slightly compromise the time it takes to return the depleted charge to the battery but, in the spirit of the invention, it will ensure that all transitions to new operating points will be maintained for a minimum time T and that the system will operate predominantly in steady state. The algorithm for this embodiment is shown in FIG. 11.

In summary, in all of the above-described embodiments, the objective of the control strategy is to service the battery as required with the maximum charge current which will be accepted while also allowing the system to spend a minimum time T at steady state at each fixed charge current step. The result is a balance between minimizing battery charge time (varying charge rate as SOC permits), maximizing fuel cell longevity (maintaining the bulk of fuel cell operation in steady state) and maximizing the longevity of the battery (ensuring voltage limits are maintained and providing a multi-stage charge).

Of course, the above benefits of the control strategy may only be achieved upon careful selection of the parameters, the most critical being time T and the charge current set points. As indicated above, the time T may be arbitrarily selected, for example, to be an order of magnitude greater than the transient time required to change set points (i.e. 5 minutes at steady state for 30 seconds of transient time). The current set points must be selected such that the charge rates permit a minimum of time T to pass before the battery voltage approaches the voltage limit $V_{Lim}$ or $V_{max}$ and such that an appropriate charge profile will be delivered to the battery given a specific battery technology. (e.g. full float charge to 110% for lead acid batteries or equalization charge for NiMH batteries). Further, depending upon the application, time T may be set at a significantly longer period than the minimum value. For example, in order to optimize operation of fuel cell 12, time T may be lengthened to reflect the typical daily duty cycle of a lift truck (FIG. 2), as determined by statistical measurements. The purpose of such optimization is to ensure that the fuel cell 12 is maintained in an equilibrium state for as long as possible based on past experience for a particular variable load before traversing to a new current output state.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of controlling the charging characteristics of a hybrid power supply apparatus comprising a current generating device and an energy storage device, the energy storage device being connectable to an external load, said method comprising:
   (a) repeatedly determining the state of charge of said energy storage device;
   (b) operating said current generating device during an operating period to produce an output current for delivery to said energy storage device;
   (c) repeatedly comparing the state of charge determined in step (a) to a predetermined set of target state of charge set points for said energy storage device; and
   (d) adjusting said output current of said current generating device by a predetermined increment whenever the state of charge of said energy storage device approximates one of said target set points, wherein said predetermined increment is sufficiently large in magnitude such that the frequency of adjustment of said output current is minimized during said operating period notwithstanding fluctuations in the power demands of said load.

2. The method of claim 1, wherein said current generating device is a fuel cell and wherein said output current is adjusted by controlling the operation of a fuel processor delivering fuel to said fuel cell.

3. The method of claim 1, further comprising calculating said target set points to ensure that the time period between adjustments of said output current is not less than a minimum time T.

4. The method of claim 1, further comprising the step of dynamically storing said set points in memory accessible by said controller during said operating period.

5. The method of claim 1, wherein said current generating device produces a DC output current and wherein said DC output current is delivered from said current generating device to said energy storage device via a DC/DC converter.

6. A hybrid power generating system comprising:
   (a) an energy storage device connectable to a load;
   (b) a current generating device for producing a charging current during an operating period;
   (c) a detector for determining the state of charge of said energy storage device; and
   (d) a controller for controlling the operation of said current generating device, wherein said controller receives input from said detector and comprises means for repeatedly comparing the state of charge of said energy storage device with a predetermined set of target state of charge set points stored in memory, wherein said controller adjusts said charging current of said current generating device in predetermined discrete increments whenever said energy storage device state of charge approximates one of said target set points, said increments being sufficiently large in magnitude such that the frequency of adjustment of said charging current is minimized during said charging period notwithstanding fluctuations in said load.

7. The system of claim 6, wherein said controller dynamically stores said set points during said charging period based on the charging characteristics of said energy storage device.

8. The system of claim 6, wherein said current generating device is a fuel cell and wherein said fuel cell is sized to produce a maximum output current corresponding to the average power demands of said load.

9. The apparatus as defined in claim 8, further comprising a DC/DC converter connected between the output of said current generating device and the input of said energy storage device.

10. The apparatus of claim 6, wherein said current generating device produces a DC output current and wherein said DC output current is delivered from said current generating device to said energy storage device via a DC/DC converter.

11. A method of controlling the charging characteristics of a hybrid power supply apparatus comprising a current generating device and an energy storage device, the energy storage device being connectable to an external load, said method comprising:
   (a) repeatedly determining the state of charge of said energy storage device;
   (b) operating said current generating device during an operating period to produce an output current for delivery to said energy storage device;

(c) storing in a memory a set of target state of charge set points for said energy storage device, said set points defining a plurality of state of charge intervals;

(d) storing in a memory a plurality of charge rates for said output current, each of said charge rates corresponding to at least one of said state of charge intervals;

(e) repeatedly comparing the state of charge determined in step (a) to said set of target state of charge set points to assign one of said state of charge intervals; and (f) setting said output current of said current generating device to a charge rate corresponding to said one of said state of charge intervals assigned in step (e).

12. The method as defined in claim 11, further comprising defining said state of charge intervals such that said output current remains set at a constant charge rate for a minimum time T even in the absence of a load.

13. The method as defined in claim 12, wherein said minimum time T is an order of magnitude larger than the time required to adjust said output current from one of said charge rates to another one of said charge rates.

14. The method of claim 11 wherein said state of charge intervals range between an uncharged state and a fully charged state of said energy storage device.

15. The method of claim 11, wherein said state of charge of said energy storage device is continuously determined throughout said operating period.

* * * * *

UNITED STATES PATENT AND TRADEMARK OFFICE
CERTIFICATE OF CORRECTION

PATENT NO.     : 6,534,950 B2
DATED          : March 18, 2003
INVENTOR(S)    : David Leboe It is certified that error appears in the above-identified patent and that said Letters Patent is hereby corrected as shown below:

<u>Title page,</u>
Item [75], the named inventor should read -- David Leboe, Vancouver (CA) --.

Signed and Sealed this

Twelfth Day of August, 2003

JAMES E. ROGAN
*Director of the United States Patent and Trademark Office*